US009193222B2

(12) United States Patent
Deniau et al.

(10) Patent No.: US 9,193,222 B2
(45) Date of Patent: Nov. 24, 2015

(54) APPARATUS AND METHOD FOR CLONING TIRE PRESSURE MONITOR SYSTEM INFORMATION (71) Applicant: Continental Automotive Systems, Inc., Auburn Hills, MI (US)

(72) Inventors: Jean-Christophe Deniau, Fenton, MI (US); Themi Anagnos, LaGrange Park, IL (US); Brian J. Farrell, Troy, MI (US)

(73) Assignee: CONTINENTAL AUTOMOTIVE SYSTEMS, INC., Auburn Hills ( * ) Notice: Subject to any disclaimer, the term of this patent is extended or adjusted under 35 U.S.C. 154(b) by 71 days.

(21) Appl. No.: 14/190,905

(22) Filed: Feb. 26, 2014

(65) Prior Publication Data

US 2015/0239304 A1  Aug. 27, 2015

(51) Int. Cl.
*B60C 23/02*  (2006.01)
*B60C 23/04*  (2006.01)

(52) U.S. Cl.
CPC ...................... *B60C 23/04* (2013.01)

(58) Field of Classification Search
CPC .. B60C 23/0416; B60C 23/0408; B60C 23/04
USPC ................. 340/442, 444, 445, 447, 435, 438; 701/36, 51
See application file for complete search history.

(56) References Cited

U.S. PATENT DOCUMENTS

| 6,731,205 B2* | 5/2004 | Schofield et al. ............. 340/444 |
| 7,574,293 B2* | 8/2009 | Vredevoogd et al. ........... 701/36 |
| 2014/0379231 A1* | 12/2014 | Hawes et al. ................... 701/51 |

FOREIGN PATENT DOCUMENTS

WO   2013063061 A1   5/2013

OTHER PUBLICATIONS

International Search Report mailed on Jun. 11, 2015 for application PCT/US2015/016182.

* cited by examiner

*Primary Examiner* — Tai T Nguyen
(74) *Attorney, Agent, or Firm* — Fitch, Even, Tabin & Flannery LLP (57) ABSTRACT A first data transmission and a second data transmission from a TPMS monitor are received and stored. The first data transmission and the second data transmission are compared and at least one changing portion of the data transmission is identified based upon the comparison. Sensed data is received from a tire pressure sensor. A data resolution is determined and a third data transmission formed. The at least one changing portion of the third data transmission is replaced with the sensed data according to the resolution. The third data transmission is transmitted including the sensed data.

18 Claims, 5 Drawing Sheets

APPARATUS AND METHOD FOR CLONING TIRE PRESSURE MONITOR SYSTEM INFORMATION

TECHNICAL FIELD

This application relates to tire pressure monitors system (TPMS) sensors, and transmissions made from these sensors.

BACKGROUND OF THE INVENTION

Tire pressuring monitoring (TPM) devices are used in today's vehicles. A tire pressure sensor senses the tire pressure reading (or other conditions, such as the temperature of the tire). These sensed readings may be communicated to a TPM receiver that is disposed in the vehicle. A display screen may also be coupled to the receiver. When the tire pressure reading falls below a particular threshold, the driver of the vehicle may be alerted, for example, by an alert message being displayed to the driver on the screen. The driver can then take any required action.

The transmissions made from the TPM sensor (transmitter) to the TPM receiver (e.g., in the vehicle) are made according to various types of formats. For instance, different automobile manufacturers use different formats. The formats relate to the positioning of data, the number of bits, the meaning of the bits, the transmission rate, the baud rate, and error-handling approaches, to mention a few examples.

In some approaches, each TPM sensor needs to be manually and individually programmed with the desired transmission format or protocol. Current approaches for programming the individual TPM sensors typically involve the use of a hand-held programming device. An operator manually programs the TPM sensor with the selected protocol or format according to the desired automobile manufacturer. Unfortunately, the manual programming approach is error prone, time-consuming, and inefficient.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where a first tire pressure monitoring system (TPMS) wheel unit (or programming tool) is configured to receive a "shell unit" transmission from a second wheel unit. The entire transmission (or selected parts of the transmission) are stored, for example, in a memory at the first wheel unit (or the tool). For instance, the decoded data or the entire physical layer transmission such as the entire burst) may be stored. The unit (or tool) identifies the data in the transmission that changes over time (such as the pressure and temperature information to mention a few examples). The wheel unit (or tool) overwrites the updated information (e.g., tire pressure data associated with the tire of the first wheel unit) into the identified location. Consequently, only the information that changes is modified while static, unchanging information remains unmodified. The modified transmission can then be made from the second wheel unit (or the tool).

In some aspects, the present approaches provide a "record and play" technique to clone a TPMS wheel unit so that no specific protocol or code needs to be utilized or programmed. Since the entire transmission is recorded and played back, all the portions of the data format that do not change are automatically produced while only data that changes is dropped and new data is inserted in the place of the changing data.

In other aspects, TPMS cloning without a scan tool is also accomplished. As a result, users do not need to purchase or utilize scan tools.

In many of these embodiments, a first data transmission and a second data transmission from a TPMS monitor are received. The first data transmission and the second data transmission are stored in a memory. The first data transmission and the second data transmission are compared and at least one changing portion of the data transmission is identified based upon the comparison. Sensed data is received from a tire pressure sensor. A data resolution is determined and a third data transmission is formed. The changing portion is replaced with the sensed data in the third data transmission according to the resolution. The third data transmission is transmitted including the sensed data with the proper resolution.

In some aspects, a resolution associated with a particular automobile manufacture is determined and the changing portion with the new data according to this resolution. In some examples, the sensed data is tire pressure information. In other examples, the sensed data is tire temperature information. Other types of data can also be written into the changing portion of the transmission.

In some other aspects, the resolution is determined utilizing a plurality of graphs stored in a memory. In other aspects, the plurality of graphs are linear graphs.

In others of these embodiments, an apparatus for cloning tire pressure information includes an interface, a memory and a controller. The interface has an input and an output and the input is configured to receive a first data transmission and a second data transmission from a TPMS monitor.

The controller is coupled to the memory and the interface. The controller is configured to store the first data transmission and the second data transmission in the memory. The controller is configured to compare the first data transmission and the second data transmission, and identify at least one changing portion of the data transmission based upon the comparison. The controller is also configured to receive sensed data from a tire pressure sensor at the input, and to determine a data resolution, and to form a third data transmission. The controller is configured to replace the at least one changing portion of the third data transmission with the sensed data according to the resolution. The controller is configured to transmit the third data transmission including the sensed data with the proper resolution at the output of the interface.

Figure 1:
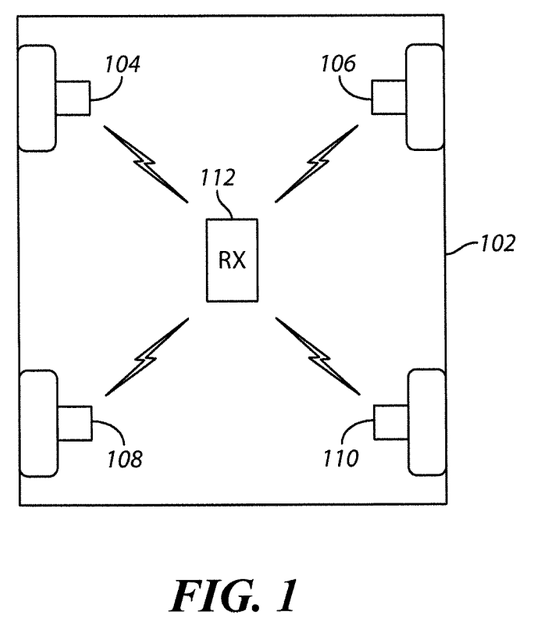
FIG. 1 comprises a block diagram of a system for cloning TPMS information according to various embodiments of the present invention.

Referring now to FIG. 1, one example of a TPMS system 100 is described. The TPMS system resides in a vehicle 102. The system includes a first TPMS monitor (or sensor or unit or wheel unit) 104, a second TPMS monitor 106, a third TPMS monitor 108, and a fourth TPMS monitor 110. The monitors 104, 106, 108, and 110 communicate with a receiver 112. The communication between the TPMS monitors 104, 106, 108, and 110 and the receiver 112 is accomplished in one aspect via wireless, radio frequency (RF) links.

The TPMS monitors 104, 106, 108, and 110 may include processing devices and memories and execute computer instructions to sense and transmit tire pressure (or other) data. In these regards, the TPMS monitors 104, 106, 108, and 110 may themselves include structures, devices, or apparatus that actually sense the pressure (or other types of data) in the tire.

The receiver 112 includes hardware and/or software to receive (and in some examples transmit) information from the TPMS monitors 104, 106, 108, and 110. The receiver 112 is disposed at an appropriate location within the vehicle 102.

When the value of the sensed data communicated from one of the sensors 104, 106, 108 and 110 falls below a predetermined threshold (e.g., below a predetermined pressure value), this data is received at the receiver 112, and a determination is made at the receiver 112 to alert the driver/or other occupant of vehicle 102. The alert may be made via a screen coupled to the receiver 112. Other types of alerts (e.g., audio alerts) may also be issued. Although the approaches described herein are described as being implemented at a wheel unit, it will be appreciated that the approaches may also be implemented at a hand held scanning tool or other similar device.

In one aspect, the location of the pressure information in the data stream transmitted by one wheel unit may be identified at another wheel unit (e.g., by looking for changes in the data stream). Then, the required resolution of the data is determined because, for example, the resolution changes between automobile manufacturers and/or wheel units. Consequently, a pressure resolution linear extrapolation may be determined and the data stream updated with measurements according to the appropriate resolution.

In another aspect, a data stream (e.g., a series of bursts) is transmitted from one wheel unit 104, 106, 108, or 110 ("the originating wheel unit") and this data burst is to be copied or cloned, RX entire transmission, change pressure at another of the wheel units 104, 106, 108, and 110 ("the cloning wheel unit"). The pressure changes over time as the originating wheel unit 104, 106, 108, or 110 transmits (over a burst), and the originating wheel unit receives successive measurements. The cloning wheel unit receives the transmission and looks for changes in the data stream to identify pressure information/data. The changing portions of the data stream may correspond to pressure and different pressures in one example.

By "cloning" and as used herein, it is meant that a transmission from a first wheel unit is copied at another second wheel unit. The copied transmission is the same as the first transmission except that new data is inserted into the copied transmission in portions of the transmission that have been identified as changing (over time).

In still another aspect, the wheel unit 104, 106, 108, or 110 may be placed into pressure chamber and the pressure changed. Transmissions may be received at this wheel unit 104, 106, 108, or 110 and changes determined in the data stream. The changing portions of the data stream may correspond to pressure and different pressures.

In yet another aspect, transmissions are received from different wheel units 104, 106, 108, or 110, for example, the two to four units from a car coming in for wheel unit replacement.

In still another aspect, transmissions are received from wheel units 104, 106, 108, 110 while mounted on tire and wheel under pressure, and then when unmounted. This approach gives one to four measurements under pressure from four wheel units (slightly different) and another four at atmospheric pressure thereby eliminating the need for using a pressure chamber. According to another aspect, a user or technician may take out some pressure from 1 to 4 tires (e.g., from approximately 30 psi to 20-25 psi, and record transmissions at 1, 2, 3, 4 or more different pressure levels). Also, the user or technician may increase pressure from in one example 30 psi to 40-45 psi and also record the corresponding transmissions and pressure readings.

In yet another aspect (since the pressure and temperature resolution and range of data is different for a limited number of protocols), and based on one measurement such as pressure, the measurement can fit one of a limited number of curve fits or resolutions. With one or more pressure measurements the wheel unit can determine which curve or resolution is a best fit and the wheel unit can then select the correct resolution. Thus, all pressure measurements can be computed with the correct resolution and then drop/inserted into the transmission bit stream. For example, the different resolutions and data ranges can correspond to the different protocols covered with the wheel unit. As such, then the wheel unit can support multiple protocols.

Figure 2:
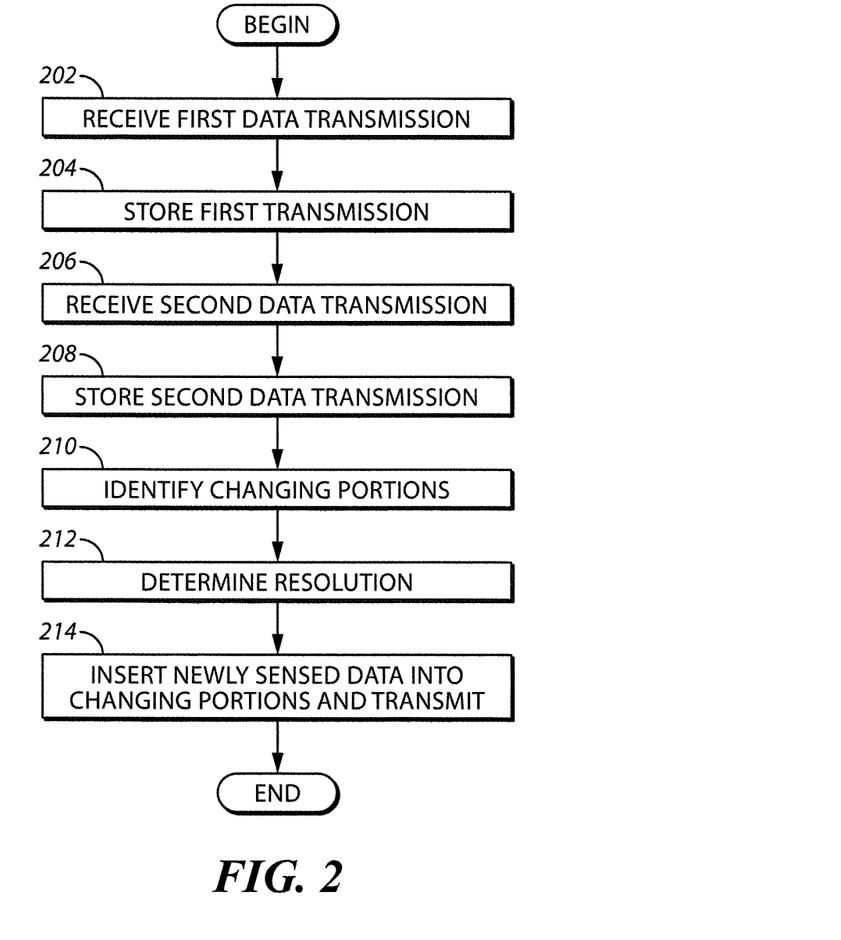
FIG. 2 comprises a flow chart of one approach for cloning TPMS information according to various embodiments of the present invention.

Referring now to FIG. 2, one example of how one wheel unit clones the transmission received from another wheel unit is described. At step 202, a first data transmission from a first wheel unit is received at a second wheel unit at (i.e., the cloning wheel unit that will be performing the cloning operation). At step 204, the first data transmission is stored at the second wheel unit. In one aspect, the data transmission is a burst of information that includes a plurality of frames, bytes, or bits to mention a few examples of the transmission units that may be included in the burst. Other examples are possible.

At step 206, a second data transmission from the first wheel unit is received at the second wheel unit. At step 208, the first data transmission is stored at the second wheel unit. As with the first transmission, the second data transmission is a burst of information that includes a plurality of frames. The burst itself may include several sub-sections with each sub-section relating to data in a format that is associated with a particular automobile manufacturer.

At step 210, the second wheel unit identifies one or more portions of the data transmission that change over time. This is accomplished by examining and comparing the received first and second transmissions (the burst) from the originating wheel unit and identifying which portion or portions (e.g., which bits, bytes, frames, or other type of data unit) changes.

At step 212, a resolution for new data is determined. The resolution may be determined by comparing the received data (for a known pressure) to various curves and determining which curve gives the best fit. At step 214, new data is inserted into the one or more portions of the transmission that change over time and this new data has the proper resolution. In one aspect, each automobile has a unique data resolution that is determined.

Figure 3:
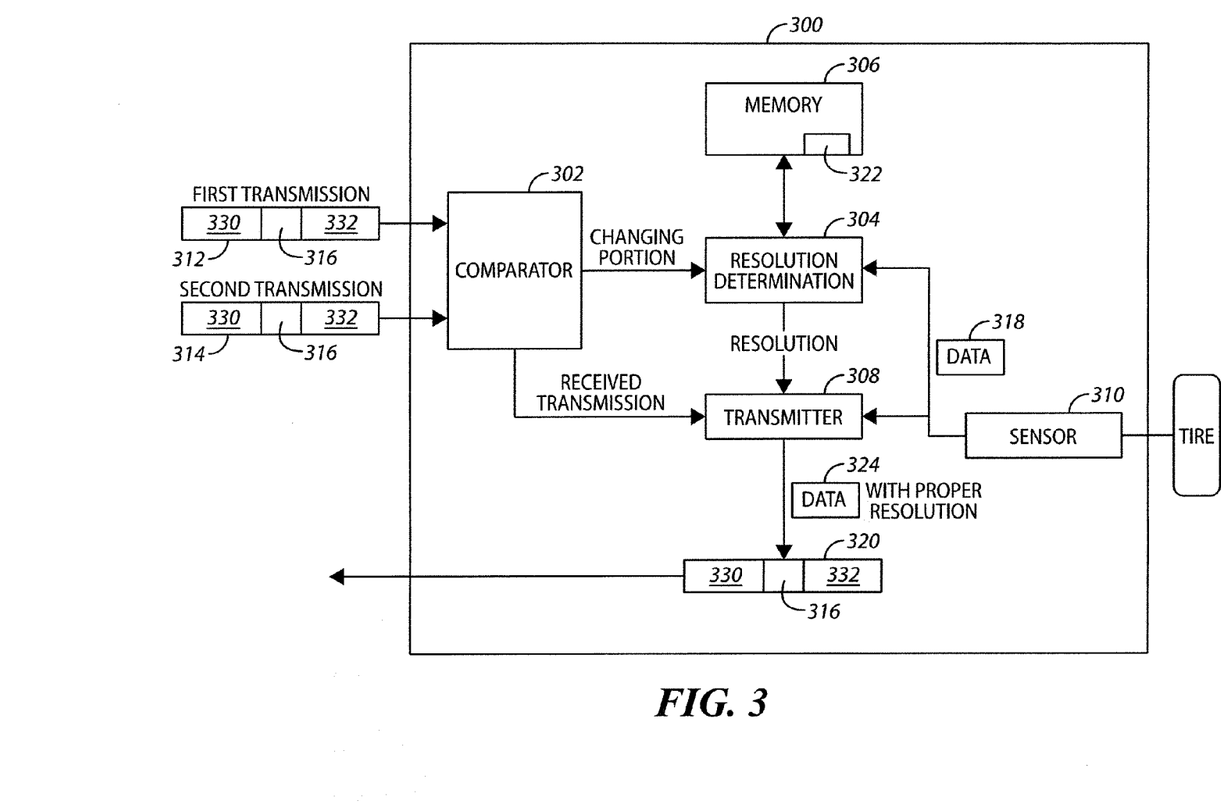
FIG. 3 comprises a block diagram of an apparatus for TPMS cloning according to various embodiments of the present invention.

Referring now to FIG. 3, one example of an apparatus 300 for cloning TPMS transmissions in a TPMS system is described. The apparatus 300 includes a comparator 302, a resolution determination module 304, a memory 306, a transmitter 308, and a sensor 310. The various elements and modules described in FIG. 3 can be implemented in hardware, software, or combinations of hardware and software.

The comparator 302 receives a first data transmission 312 and a second data transmission 314. The transmissions 312 and 314 may be, in one aspects, bursts of information. In this respect, the transmissions 312 and 314 may include transmissions made according to multiple formats. Alternatively, the transmissions 312 and 314 may include transmissions made according to a single format.

The comparator 302 compares the two transmissions 312 and 314 and based upon the comparison determines which portions 316 of the transmission change. The changing portions 316 identify where pressure (or other type of sensed) data 318 will be inserted in a third transmission 320 that will eventually be transmitted from the transmitter 308. The third transmission 320 has the same format as the transmission 312 and 314. The difference between the original transmissions 312 and 314 is that the new pressure data 318 is inserted in the changing portion 316 of the transmission 320. The remaining portions (330 and 332) of the transmissions 320 are identical to the remaining portions (330 and 332) of transmissions 312 and 314.

Forming the third transmission may involve various types of operations and approaches and may be accomplished in different ways. In one approach, the forming merely takes any transmission originating from an originating wheel unit (including the first transmission 312 or second transmission 314 or any future transmission), stores the transmission in memory (briefly, for a longer period of time, or permanently), and overwrites the changing portion with sensed data. In other examples, nothing is stored for a significant amount of time except the location of the changing portion. As new transmissions are received, they are simply re-transmitted as received except the changing portion is overwritten with newly sensed data from the cloning wheel unit.

Figure 4:
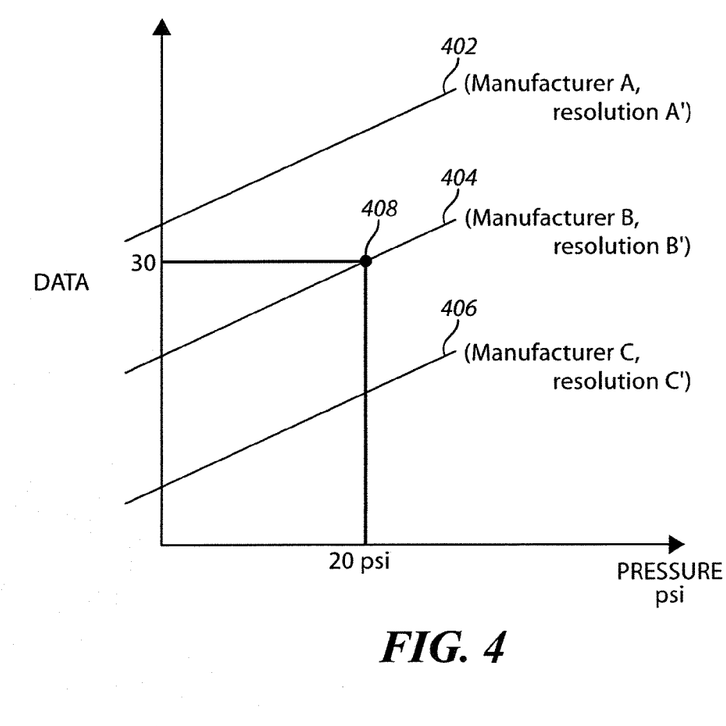
FIG. 4 comprises a graph showing various resolution curves used in determining the resolution of cloned data according to various embodiments of the present invention.

In one aspect, before the pressure data 318 is inserted into the transmission 320, it is done so according to a required or needed resolution. In this respect, the resolution determination module 304 obtains from memory 306 information 322 in order to determine the correct resolution. This process is described in greater detail below with respect to FIG. 4. In the example of FIG. 4, the pressure data is determined for a particular pressure (e.g., 30 psi) and then the graphs are examined to see (for the given pressure) which curve is the best fit. Once the best fit is determined, then the resolution has also been determined. The data 324 actually inserted into the transmission 320 has the correct resolution. As mentioned, the rest of the data in the transmission 320 is the same and is replicated from the transmissions 312 and/or 314.

Referring now to FIG. 4, one example of pressure resolution extrapolation is described. Generally speaking, a determination is first made of curves that represent the data resolution of different manufacturers. For example, 0 psi may map to hex AAAA for one manufacturer or hex 0000 for another manufacturer. In other examples, 100 psi may map to hex FFFF for the first manufacturer and AAAA for the second manufacturer. As will be appreciated, the resolution mapping between actual measurements and transmitted data is typically different for different manufacturers. This mapping must be determined or the receiver (which is expecting to receive data with a certain resolution) will not be able to recognize the transmission or will decode the data with the improper resolution (thus determining an improper value for the data).

As shown in FIG. 4, a first manufacturer has a first curve 402. A second manufacturer has a second curve 404. A third manufacturer has a third curve 406. In this example, the curves are linear and have associated with them an equation y=mx+b, where m is the slope (of a particular line) and b is the y intercept (of that line). However, it will be appreciated that the curves do not have to be linear and can be of any shape and be described by any type of equation or equations. In the graphs of FIG. 4, the x-axis represents pressure readings and the y-axis represents data values (e.g., in hex form).

In one aspect, each curve 402, 404, or 406 is determined by testing. For instance and in a test chamber, two or more data points are received. Based on pressure readings, readings for different pressure measurements and the corresponding pressure measurement, could be linear or non-linear. A slope (m) can be determined by two pressure readings as can the y-intercept. From this information, the equation y=mx+b is determined. This algorithm may be implemented in an application specific integrated circuit (ASIC) in one approach.

After the exact curve is determined (e.g., the equation describing the curve), the resolution of the pressure information that is being automatically determined. At any given pressure (e.g., 30 psi), a unique value (e.g., representing tire pressure) is transmitted by a sensing apparatus (e.g., a pressure sensing device) of a first manufacturer, another unique number by a second manufacturer, and still another unique number by a third manufacturer. So, for example, 29-31 psi may be transmitted as a hex 49 plus/minus tolerance hex for the first manufacturer, hex 29-31 for the second manufacturer, and hex 19-21 for the third manufacturer. If the actual sensed reading for 20 psi is hex 30, a comparison is made to see on which graph 402, 404, or 406 the data falls. In this case, it can be seen that this falls on point 408 on curve 404. Now, the wheel unit knows the proper resolution (the resolution associated with the curve 404) to use and the present data as well as all future data can be mapped according to the proper resolution.

Figure 5:
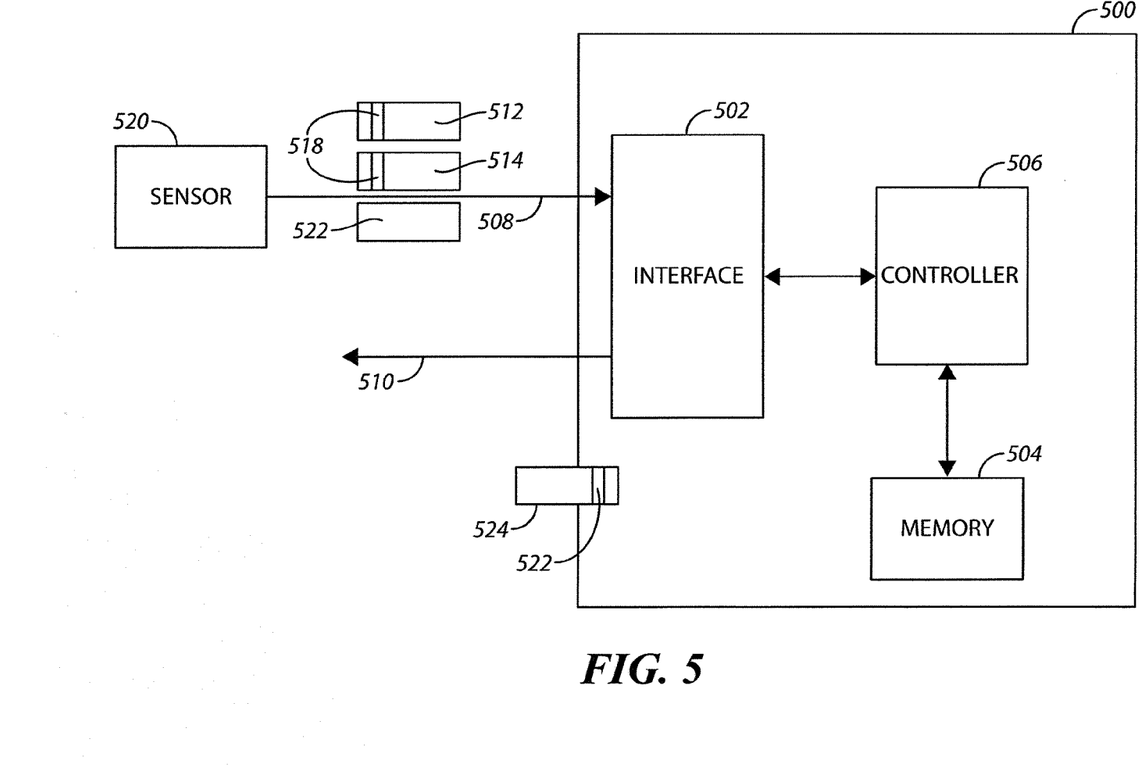
FIG. 5 comprises a block diagram of an apparatus for TPMS cloning according to various embodiments of the present invention.

Referring now to FIG. 5, an apparatus 500 for cloning tire pressure information includes an interface 502, a memory 504 and a controller 506. The interface 502 has an input 508 and an output 510 and the input 508 is configured to receive a first data transmission 512 and a second data transmission 514 from a TPMS monitor 516. The apparatus 500 may be implemented as any combination of hardware and software elements. The apparatus 500 may be disposed at a wheel unit or as a programming device used by a technician. Other placements are possible.

The controller 506 is coupled to the memory 504 and the interface 502. The controller 506 is configured to store the first data transmission 512 and the second data transmission 514 in the memory 504. The controller 506 is configured to compare the first data transmission 512 and the second data transmission 514, and identify at least one changing portion 518 of the data transmissions 512 and 514 based upon the comparison. The controller 506 is furthered configured to receive sensed data 522 from a tire pressure sensor 520 at the input 508, to determine a data resolution, and replace the at least one changing portion 518 with the sensed data 522 according to the resolution. The controller 506 is configured to transmit a third data transmission 524 including the sensed data 522 in the changing portion 518 at the output 510 of the interface 502.

It should be understood that any of the devices described herein (e.g., the programming or activation devices, the wheel units, the controllers, the receivers, the transmitters, the sensors, the presentation devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of cloning a tire pressure monitoring system (TPMS) monitor, comprising:
   receiving a first data transmission and a second data transmission from a TPMS monitor;
   storing the first data transmission and the second data transmission;
   comparing the first data transmission and the second data transmission, and identifying at least one changing portion of the data transmission based upon the comparing;
   receiving sensed data from a tire pressure sensor;
   determining a data resolution from stored test data;
   forming a third data transmission identical to the first data transmission and second data transmission, the third data transmission including the at least one changing portion;
   replacing the at least one changing portion of the third data transmission with the sensed data according to the data resolution;
   transmitting the third data transmission.

2. The method of claim 1, wherein determining the resolution comprises identifying a resolution associated with a particular automobile manufacture and replacing the at least one changing portion with the new data according to the resolution.

3. The method of claim 1 wherein the sensed data comprises tire pressure information.

4. The method of claim 1 wherein the sensed data comprises tire temperature information.

5. The method of claim 1 wherein the determining the resolution utilizes a plurality of graphs stored in a memory.

6. The method of claim 5 wherein the plurality of graphs are linear graphs.

7. An apparatus for cloning tire pressure information, the apparatus comprising:
   an interface with an input and an output, the input configured to receive a first data transmission and a second data transmission from a TPMS monitor;
   a memory;
   a controller coupled to the memory and the interface, the controller configured store the first data transmission and the second data transmission in the memory, the controller configured to compare the first data transmission and the second data transmission, and identifying at least one changing portion of the data transmission based upon the comparison, the controller configured to receive sensed data from a tire pressure sensor at the input, the controller configured to determine a data resolution from stored test data and to form a third data transmission identical to the first data transmission and the second data transmission, the third data transmission including the at least one changing portion, the controller configured to insert the sensed data in the at least one changing portion of the third data transmission according to the data resolution, the controller configured to transmit the third data transmission at the output of the interface.

8. The apparatus of claim 7, wherein the controller is configured to identify a resolution associated with a particular automobile manufacture and replacing the at least one changing portion with the new data according to the resolution.

9. The apparatus of claim 7 wherein the sensed data comprises tire pressure information.

10. The apparatus of claim 7 wherein the sensed data comprises tire temperature information.

11. The apparatus of claim 7 wherein the controller determines the resolution utilizing a plurality of graphs stored in the memory.

12. The apparatus of claim 11 wherein the plurality of graphs are linear graphs.

13. A computer usable non-transitory medium having a computer readable program code embodied therein, said computer readable program code adapted to be executed to implement a method of cloning a tire pressure monitor information, the method comprising:
   receiving a first data transmission and a second data transmission from a TPMS monitor;
   storing the first data transmission and the second data transmission;
   comparing the first data transmission and the second data transmission, and identifying at least one changing portion of the data transmission based upon the comparing;
   receiving sensed data from a tire pressure sensor;
   determining a data resolution from stored test data;
   forming a third data transmission identical to the first data transmission and second data transmission, the third data transmission including the at least one changing portion;

replacing the at least one changing portion of the third data transmission with the sensed data according to the data resolution;

transmitting the third data transmission.

14. The computer usable non-transitory medium of claim 13, wherein determining the resolution comprises identifying a resolution associated with a particular automobile manufacture and replacing the at least one changing portion with the new data according to the resolution.

15. The computer usable non-transitory medium of claim 13 wherein the sensed data comprises tire pressure information.

16. The computer usable non-transitory medium of claim 13 wherein the sensed data comprises tire temperature information.

17. The computer usable non-transitory medium of claim 13 wherein the determining the resolution utilizes a plurality of graphs stored in a memory.

18. The computer usable non-transitory medium of claim 17 wherein the plurality of graphs are linear graphs.

* * * * *